(12) United States Patent
Dravnieks et al.

(10) Patent No.: US 8,177,122 B2
(45) Date of Patent: *May 15, 2012

(54) PROVIDING DIAGNOSTIC INFORMATION ON THE PROCESSING OF VARIABLES IN SOURCE CODE

(75) Inventors: John Robert Dravnieks, Kardinya (AU); John Robert Ehrman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1181 days.

This patent is subject to a terminal disclaimer.

(21) Appl. No.: 11/950,348

(22) Filed: Dec. 4, 2007

(65) Prior Publication Data

US 2008/0086721 A1     Apr. 10, 2008

Related U.S. Application Data

(63) Continuation of application No. 11/118,040, filed on Apr. 29, 2005, now Pat. No. 7,357,332.

(51) Int. Cl.
*G06K 19/06* (2006.01)
(52) U.S. Cl. .................. 235/375; 235/492; 235/494
(58) Field of Classification Search .................. 235/100, 235/492, 375, 494; 717/126, 130, 151, 142, 717/139, 143, 131

See application file for complete search history.

(56) References Cited

U.S. PATENT DOCUMENTS

| | | | |
|---|---|---|---|
| 5,278,986 A | 1/1994 | Jourdenais et al. | |
| 5,381,550 A | 1/1995 | Jourdenais et al. | |
| 5,615,369 A | 3/1997 | Holler | |
| 5,630,137 A | 5/1997 | Carney et al. | |
| 5,771,382 A | 6/1998 | Wang et al. | |
| 5,852,731 A | 12/1998 | Wang et al. | |
| 6,106,571 A * | 8/2000 | Maxwell | 717/131 |
| 6,167,566 A * | 12/2000 | Matsuo et al. | 717/112 |
| 6,182,283 B1 | 1/2001 | Thomson | |
| 6,223,337 B1 * | 4/2001 | Blume | 717/126 |
| 6,523,097 B1 | 2/2003 | Liedtke et al. | |
| 6,715,141 B1 | 3/2004 | Hodge | |
| 7,357,332 B2 * | 4/2008 | Dravnieks et al. | 235/494 |
| 2001/0034743 A1 | 10/2001 | Thomas | |
| 2006/0123279 A1 | 6/2006 | Cardinell | |
| 2006/0243787 A1 * | 11/2006 | Dravnieks et al. | 235/100 |
| 2008/0086721 A1 * | 4/2008 | Dravnieks et al. | 717/124 |
| 2009/0055603 A1 * | 2/2009 | Holt | 711/154 |
| 2009/0235033 A1 * | 9/2009 | Holt | 711/148 |

OTHER PUBLICATIONS

Office Action 1, Jun. 1, 2007, for U.S. Appl. No. 11/118,040, Total 9 pp.

(Continued)

*Primary Examiner* — Thien M Le
(74) *Attorney, Agent, or Firm* — David W. Victor; Konrad Raynes & Victor LLP

(57) ABSTRACT

Provided are a system and article of manufacture for providing diagnostic information on the processing of variables in source code. Source code is scanned for an instance of a variable. An entry is added to a symbol table for the variable and indication is made in the entry that the variable is declared in response to determining that the symbol table does not include an entry for the variable and that the instance of the variable comprises a declaration of the variable. A message is generated indicating that the variable is referenced and undeclared in response to determining that the instance of the variable comprises a reference of the variable and that the symbol table does not include one entry for the variable.

14 Claims, 3 Drawing Sheets

OTHER PUBLICATIONS

Amendment 1, Sep. 4, 2007, for U.S. Appl. No. 11/118,040, Total 13 pp.

Notice of Allowance 1, Sep. 20, 2007, for U.S. Appl. No. 11/118,040, Total 6 pp.

Notice of Allowability 1, Mar. 4, 2008, for U.S. Appl. No. 11/118,040, Total 7 pp.

Coleman, C.D., E.B. Fernandez, and R.C. Summers, "Compile-Time Data Access Analysis", IBM Technical Disclosure Bulletin, vol. 20, No. 9, Feb. 1978, pp. 3695-3698.

Freeman, D.N., "Macro Language Design for System/360", IBM Systems Journal, vol. 5, No. 2, 1966, pp. 62-77.

Kent, W., "Assembler-Language Macroprogramming: A Tutorial Oriented Toward the IBM 360", Computing Surveys, vol. 1, No. 4, Dec. 1969, pp. 183-196.

IBM Corporation, "Language Reference", High Level Assembler for MVS & VM & VSE, Release 5, Fifth Edition (Jun. 2004), © International Business Machines Corporation 1982, 2004, Total 474 pp.

\* cited by examiner

Symbol Table Entry

PROVIDING DIAGNOSTIC INFORMATION ON THE PROCESSING OF VARIABLES IN SOURCE CODE

CROSS-REFERENCE TO RELATED APPLICATIONS

This application is a continuation of application Ser. No. 11/118,040, filed on Apr. 29, 2005, which application is incorporated herein by reference in its entirety.

BACKGROUND OF THE INVENTION

1. Field of the Invention

The present invention relates to a system and program for providing diagnostic information on the processing of variables in source code.

2. Description of the Related Art

Programmers write computer programs in high level languages referred to as the source code which includes data declarations and instructions that operate on data. All addressing is symbolic, which means that the programmer assigns labels (names) to individual data elements and instructions to use throughout the program. Before the program can be executed, the source code must be transformed to machine readable executable code.

An assembler or compiler translates the source module into an object module, which includes machine readable executable code, data, external symbol definitions and references, address constants, and further bookkeeping information used in the process of transforming the object module into an executable file. Symbol references and address constants in one object module may reference text defined in another object module. The term "text" as defined and used herein means data and/or code. A linkage editor combines one or more object or load modules into an executable load module in preparation for execution. Typically, the linkage editor combines object modules that contain a single definition of a symbol, i.e., symbol definition, and one or more references to the symbol, i.e., symbol references. If one object module includes a reference to an external symbol defined in another object module, then the linkage editor may resolve this reference with the definition in the load module.

Certain programming languages provide extensions and enhancements implemented using macro-processors and pre-processors, referred to herein as preprocessors. A preprocessor performs a series of textual transformations on the source code before translation by the language translator, such as compilers, assemblers, interpreters, etc. A macro processor allows the programmer to define and to use macros in assembly programs. The program includes a macro definition comprising an association of code and a macro name, such that the use of the macro name in the code results in the name being substituted for the code specified in the macro definition. A preprocessor also processes the source code before the translation stage. These processors provide added generality and flexibility to the programmer.

Unlike typical high-level languages, preprocessors may have fewer constraints than higher level translators on the use of names that are specific to the macro- and pre-processing environment. These names are referred to "variable symbols", as opposed to the symbol names used to translate the output. A preprocessor may not require that variable symbols be declared and initialized before they are referenced in statements of the preprocessor language. The lack of such declaration and initialization requirements may result in detection of a misuse of a variable symbol. Further, the preprocessor may implicitly declare the variable by assigning default properties, such as a default type, to the undeclared variable to allow translation of the source code to continue. These assigned properties in the implicit declaration may or may not be what the user desired or expected and thus cause errors in the object code resulting from the translated source code.

Assigning default properties and values to undeclared variable symbols may result in an improper value being substituted to produce unexpected results. Further, leaving a variable symbol undeclared, i.e., undefined, may lead to unexpected default values being substituted. Problems with incompatible implicit declarations and undefined variables may not be identified unless a syntax error results.

SUMMARY

Provided are a method, system, and program for providing diagnostic information on the processing of variables in source code. Source code is scanned for an instance of a variable. An entry is added to a symbol table for the variable and indication is made in the entry that the variable is declared in response to determining that the symbol table does not include an entry for the variable and that the instance of the variable comprises a declaration of the variable. A message is generated indicating that the variable is referenced and undeclared in response to determining that the instance of the variable comprises a reference of the variable and that the symbol table does not include one entry for the variable.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
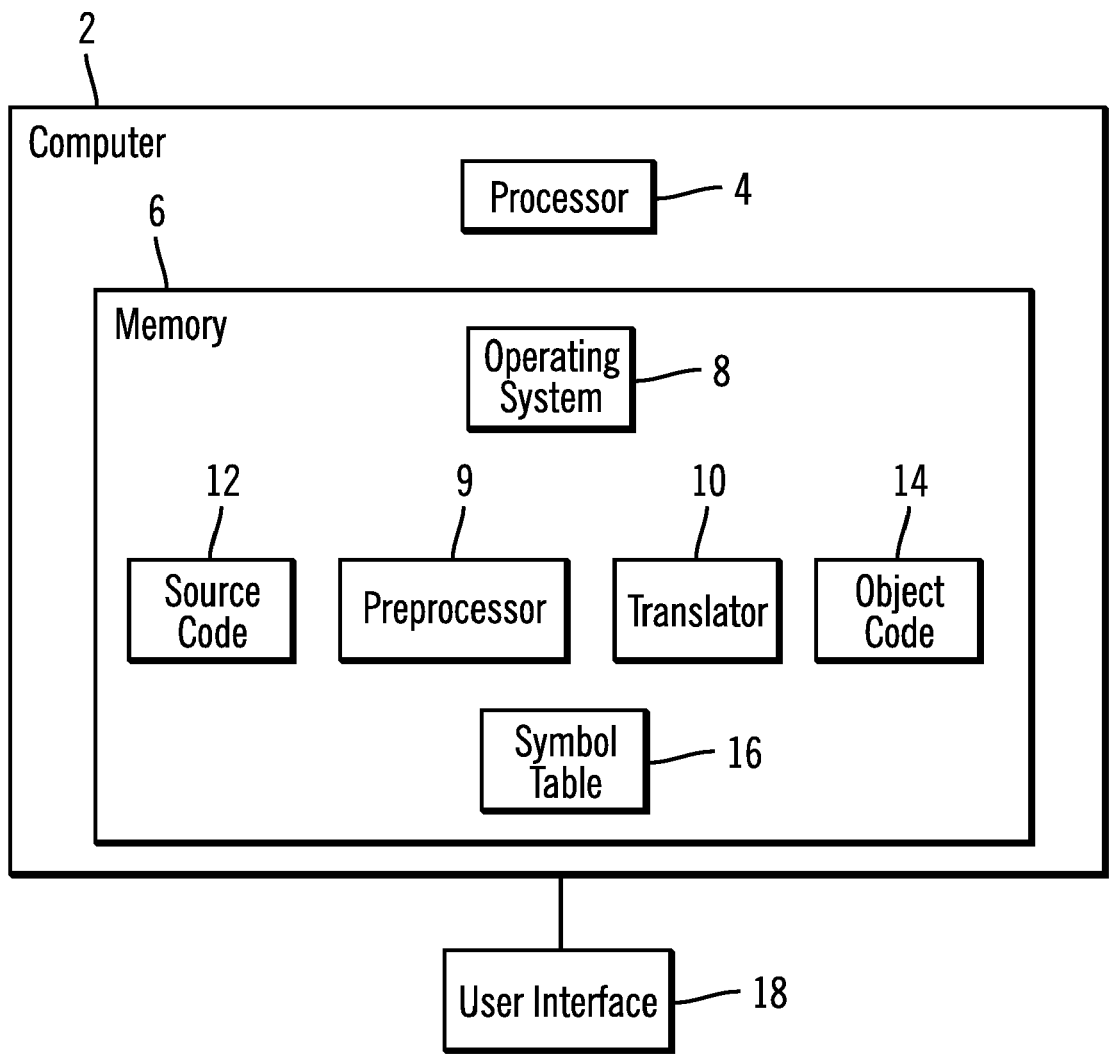
FIG. 1 illustrates an embodiment of a computing environment.

FIG. 1 illustrates an embodiment of a computing environment. A computer 2 includes a processor 4 and memory 6. The processor 4 executes in the memory 6 an operating system 8 and a translator 10, which translates source code 12 in a high level computer language into executable object code 14. The high level computer language may comprise assembly language, C, C++, and other suitable high level computer languages known in the art. A preprocessor 9, such as a macro processor or other preprocessor, initially processes the source code 12 to provide input to the translator 10. The preprocessor 9 may perform such functions as macro processing to expand macro names into the code associated with the macro, file inclusion to include header files into the program text, augment the source code with expanded language statements and capabilities, and to process variable symbols. The translator 10 analyzes the source code 12 and may synthesize the source code 12 into an object module. The translator 10 may include a binder program to process object modules to produce executable program objects and include a program fetch to load the executable text from the program object into the memory 6 for execution by the processor.

In processing the source code 12, the preprocessor 9 may generate a symbol table 16 including information on processed variable symbols in the source code 12. The preprocessor 9 may generate information on variable symbols in messages a user may observe on a user interface 18 coupled to the computer 2. The user interface 18 may comprise a display monitor presenting information from the translator 10 on the result of processing the variable symbols during the compilation/assembly process.

Figure 2:
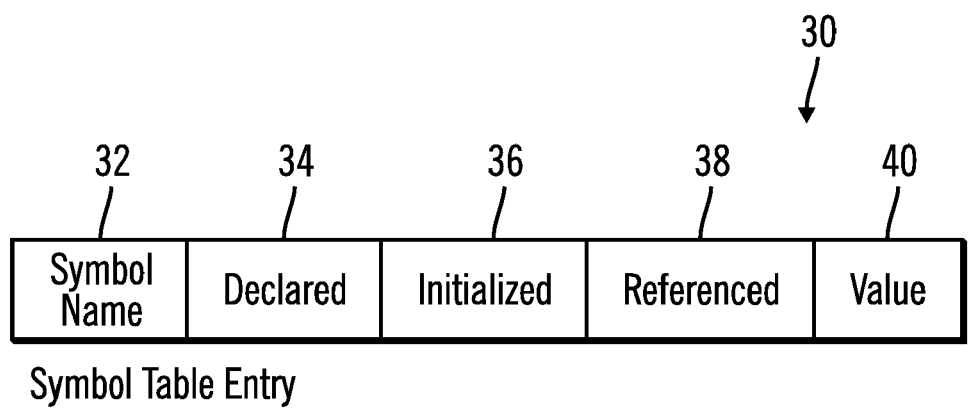
FIG. 2 illustrates an embodiment of a symbol table entry.

FIG. 2 illustrates a format of an entry 30 in the symbol table 16 maintained for each variable symbol, including: the symbol name 32; a declared flag 34 indicating whether the variable symbol was declared in a declaration statement; an initialized flag 36 indicating whether the variable symbol was initialized in a program statement; a referenced flag 36 indicating whether the variable symbol was referenced in a program statement; and a value 38 to which the variable symbol is set when initialized.

Figure 3A:
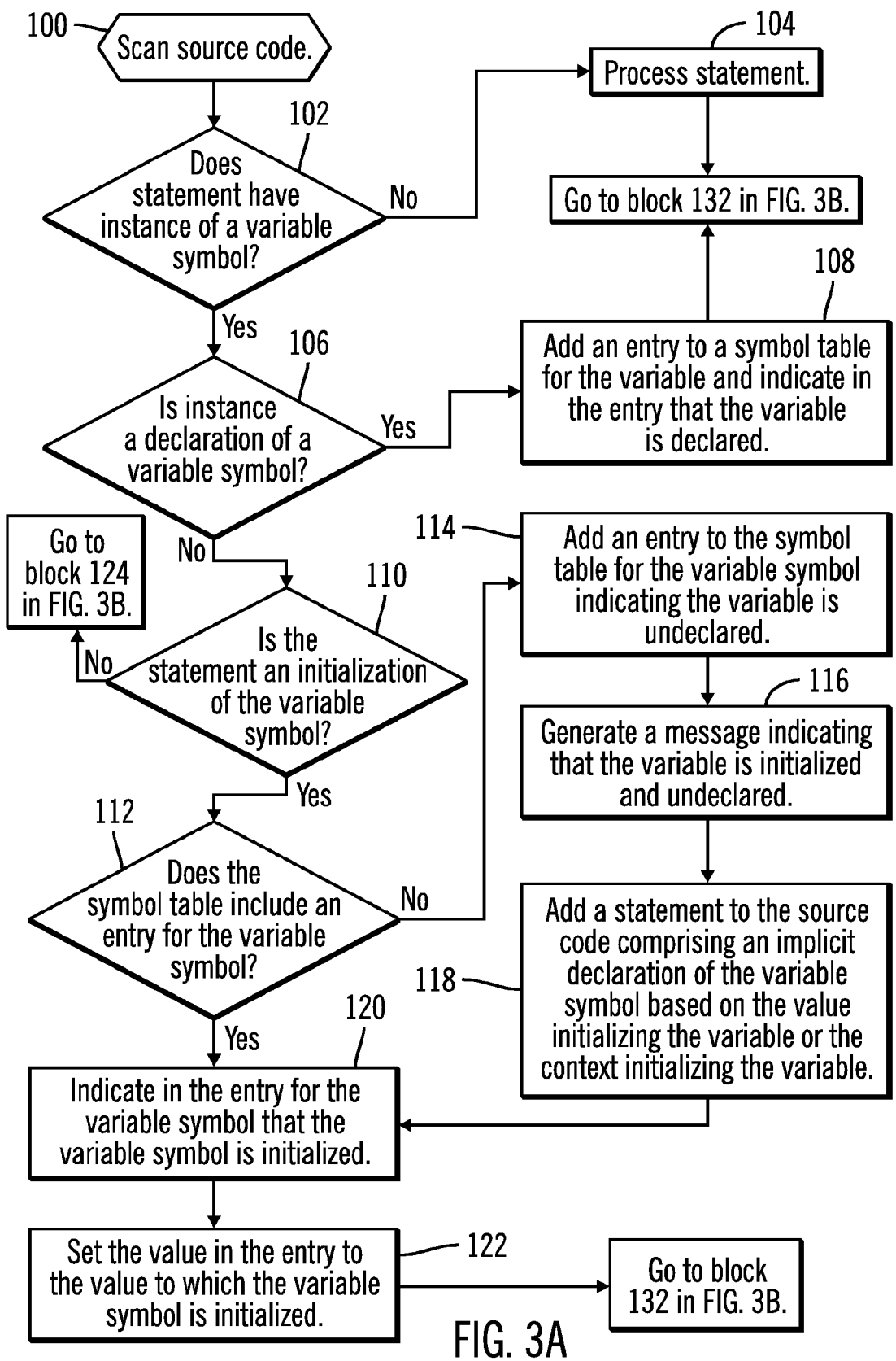
FIGS. 3a and 3b illustrate an embodiment of operations to process variable symbols when translating source code.
Figure 3B:
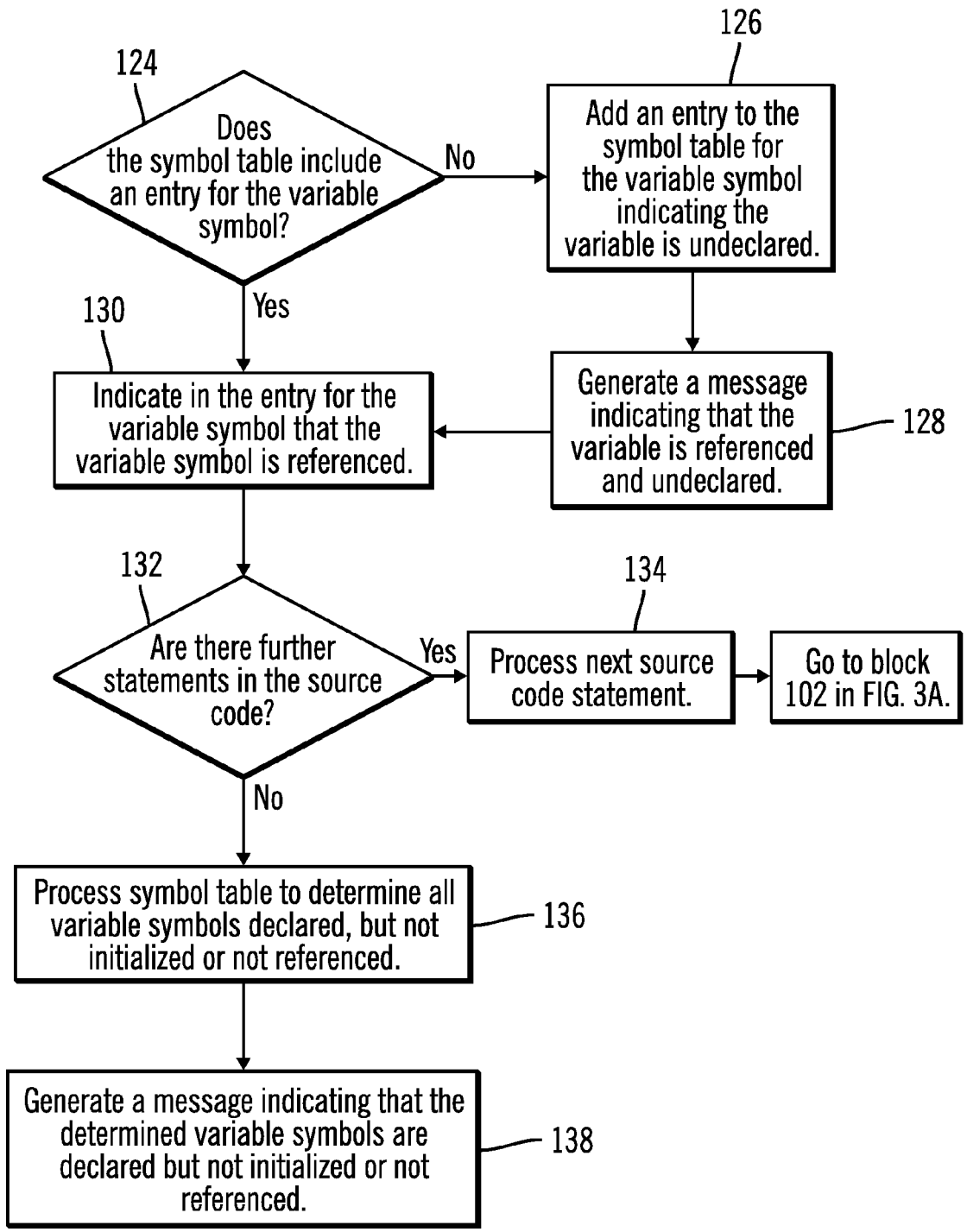

FIGS. 3a and 3b illustrate operations performed by the processor 4 executing the preprocessor 9 to process the source code 12 statements as part of a preprocessing operation. With respect to FIG. 3a, the preprocessor 9 scans (at block 100) the source code 12 statements. If (at block 102) the scanned statement does not reference a variable symbol, then the statement is processed (at block 104) and translated and control proceeds to block 132 in FIG. 3b to determine next statement processing. If (at block 102) the statement comprises an instance of a variable symbol, i.e., a declaration, initialization or reference, and if (at block 106) the instance of the variable symbol comprises a declaration of the variable symbol, then an entry is added (at block 108) to the symbol table 16 for the variable symbol indicating that the variable symbol is declared. Control then proceeds to block 132 in FIG. 3b for next statement processing.

If (at block 106) the instance of the variable symbol does not comprise a declaration, but instead comprises (at block 110) an initialization of the variable symbol, then a determination is made (at block 112) as to whether there is an entry 30 in the symbol table 16 for the variable symbol in the instance. If (at block 112) there is no entry 30 in the symbol table 16, then an entry is added (at block 114) to the symbol table 16 for the variable symbol indicating that the variable is undeclared. The preprocessor 9 generates (at block 116) a message indicating that the variable is initialized and undeclared. This message may be rendered on the user interface 18 to make the user aware of this error in the source code 12 to improve diagnosing of the source code 12. The preprocessor 9 may further add (at block 118) a statement to the source code 12 comprising an implicit declaration of the variable symbol based on the value initializing the variable or the context initializing the variable. For instance, if the statement comprises the initialization of an arithmetic value then the implicit declaration may comprise a declaration of the variable symbol being initialized as an arithmetic type.

Statement (1) below is an example of initializing the variable "&E" to the arithmetic value "7":

&E SETA 7  (1)

Upon identifying the statement (1) when the variable "&E" is not previously declared, the preprocessor 9 may add a statement to the source code 12 of "LCLA &E", which comprises a declaration of a local arithmetic variable "&E". These examples utilize the syntax from the International Business Machines Corporation ("IBM") High Level assembler language as described in the IBM publication "High Level Assembler for MVS & VM & VSE, Language Reference, Release 5", document no. SC26-4940-04 (Copyright IBM, 5$^{th}$ Ed., June 2004).

From block 118 or if (from the no branch of block 112) the symbol table 16 includes an entry for the variable symbol being initialized, the preprocessor 9 indicates (at block 120) in the entry 30 for the variable symbol in the symbol table 16 that the variable symbol is initialized, which in certain embodiments may involve setting the initialized flag 36. The value field 40 in the entry for the variable symbol is set (at block 122) to the value to which the variable symbol is initialized. Control then proceeds to block 132 in FIG. 3b for next statement processing.

If (at block 110) the instance of the variable symbol is not an initialization of the variable, then the instance of the variable symbol comprises a reference to the variable and control proceeds to block 124 in FIG. 3b. If (at block 124) the symbol table 16 does not include an entry 30 for the variable symbol being referenced, then the preprocessor 9 adds (at block 126) an entry 30 to the symbol table 16 for the variable symbol indicating that the variable is undeclared. The preprocessor 9 generates (at block 128) a message indicating that the variable symbol is referenced and undeclared. From block 128 or if (from the yes branch of block 124) the symbol table 16 includes an entry for the variable, the preprocessor 9 indicates (at block 130) in the entry 30 for the variable symbol that the variable symbol is referenced, which in certain embodiments may involve setting the referenced flag 38.

From block 104, 108, 122 or 130, if (at block 132) there are further statements in the source code 12, then the next statement is processed (at block 134) and control proceeds to block 102 in FIG. 3a to process any variable symbol instance in the statement. If (at block 132) there are no further statements in the source code 12, then the preprocessor 9 processes (at block 136) the symbol table 16 to determine all variable symbols declared, but not initialized or referenced. In certain embodiments, this determination may involve locating all symbol table entries 30 whose declared flag 32 is set, but initialized flag 36 and/or referenced flag 38 is not set. The preprocessor 9 then generates (at block 138) a message indicating that the determined variable symbols are declared but not initialized or not referenced.

If a variable symbol comprises an array or dimensioned variable symbol having a plurality of elements, an entry is added to the symbol table 16 for each variable element of the dimensioned variable symbol. For instance, the statement (2) below:

LCLA &D(10)  (2)

comprises a declaration of a local arithmetic dimensioned variable "&D(10)" having ten elements. The preprocessor 9 sets the entry 30 in the symbol table 16 for each element of the dimensioned variable "&D(10)" to indicate that the element is declared, such as by setting the declared flag 34 in the entries for the elements. The entries 30 for the elements of the dimensioned variable symbol are further updated to reflect initialization and/or reference to the variable symbol elements.

The described embodiments provide techniques to generate diagnostic information during the compiling or assembly process of source code 12, which may be performed by a preprocessor or macro processor, to notify a user or developer of certain anomalies in the source code, such as variable symbols referenced and/or initialized, but not declared or variable symbols declared, but not initialized and/or referenced. The diagnostic may be presented to the user on a user interface 18. Providing such diagnostic information on errors in the source code statements with respect to variable symbols improves the readability and operability of the compiled object code 14 resulting from the source code 12.

In the described embodiments, a preprocessor 9 processed variable symbols in source code to generate a message indicating that the variable symbol is referenced and undeclared in response to determining that the instance of the variable comprises a reference of the variable and that the symbol table does not include one entry for the variable. In an alternative embodiment, the operations described as performed by a preprocessor with respect to variable symbols in the source code may be performed by a compiler with respect to symbolic names the compiler must resolve to translate the output of the preprocessor into executable or interpretable code. Thus, the operations may be performed by different program processors, where a program processor comprises a preprocessor or compiler, on different types of variables, where a variable comprises a variable symbol processed by a preprocessor or a symbolic name processed by a compiler. For instance, the described embodiments may apply to scripting and text-markup languages such as GML.

Additional Embodiment Details

The described operations may be implemented as a method, apparatus or article of manufacture using standard programming and/or engineering techniques to produce software, firmware, hardware, or any combination thereof The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The illustrated operations of FIGS. 3a and 3b show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
   a processor;
   a memory accessible to the processor;
   a computer readable medium including code executed by the processor to perform operations, the operations comprising:
      scanning source code for an instance of a variable;
      adding an entry to a symbol table in the memory for the variable and indicating in the entry that the variable is declared in response to determining that the symbol table does not include the entry for the variable and that the instance of the variable comprises a declaration of the variable;
      generating a message indicating that the variable is referenced and undeclared in response to determining that the instance of the variable comprises a reference of the variable and that the symbol table does not include one entry for the variable; and adding an entry to the symbol table on the instance of the variable and indicating in the entry that the variable is undeclared in response to determining that the instance of the variable comprises a reference to the variable and that the symbol table does not include one entry for the variable.

2. The system of claim 1, wherein the operations further comprise:
generating a message indicating that the variable is initialized and undeclared in response to determining that the instance of the variable comprises an initialization of the variable and that the symbol table does not include one entry for the variable;
adding an entry to the symbol table for the variable; and
indicating in the entry that the variable is initialized and undeclared in response to determining that the instance of the variable comprises the initialization of the variable and that the symbol table does not indicate that the variable symbol is declared.

3. The system of claim 1, wherein the operations further comprise:
indicating in the entry for the variable that the variable is initialized in response to determining that the instance of the variable comprises an initialization of the variable and that the symbol table includes one entry for the variable indicating that the variable is declared;
indicating in the entry a value to which the instance of the variable is initialized; and
indicating in the entry for the variable that the variable is referenced in response to determining that the instance of the variable comprises a reference to the variable and that the symbol table includes one entry for the variable indicating that the variable is declared.

4. The system of claim 1, wherein the code executed to perform the operations of scanning the source code, adding the entry to the symbol table, and generating the message comprises a preprocessor and wherein the variable comprises a variable symbol.

5. The system of claim 1, wherein the code executed to perform the operations of scanning the source code, adding the entry to the symbol table, and generating the message comprises a compiler and wherein the variable comprises a symbolic name.

6. An article of manufacture including code capable of being executed to perform operations, the operations comprising:
scanning source code for an instance of a variable;
adding an entry to a symbol table for the variable and indicating in the entry that the variable is declared in response to determining that the symbol table does not include the entry for the variable and that the instance of the variable comprises a declaration of the variable; and
generating a message indicating that the variable is referenced and undeclared in response to determining that the instance of the variable comprises a reference of the variable and that the symbol table does not include one entry for the variable; and
adding an entry to the symbol table on the instance of the variable and indicating in the entry that the variable is undeclared in response to determining that the instance of the variable comprises a reference to the variable and that the symbol table does not include one entry for the variable.

7. The article of manufacture of claim 6, wherein the operations further comprise:
generating a message indicating that the variable is initialized and undeclared in response to determining that the instance of the variable comprises an initialization of the variable and that the symbol table does not include one entry for the variable;
adding an entry to the symbol table for the variable; and
indicating in the entry that the variable is initialized and undeclared in response to determining that the instance of the variable comprises the initialization of the variable and that the symbol table does not indicate that the variable symbol is declared.

8. The article of manufacture of claim 7, wherein the operations further comprise:
adding a statement to the source code comprising an implicit declaration of the variable symbol based on the instance of the variable initializing the variable in response to determining that the variable is initialized and undeclared.

9. The article of manufacture of claim 6, wherein the operations further comprise:
indicating in the entry for the variable that the variable is initialized in response to determining that the instance of the variable comprises an initialization of the variable and that the symbol table includes one entry for the variable indicating that the variable is declared;
indicating in the entry a value to which the instance of the variable is initialized; and
indicating in the entry for the variable that the variable is referenced in response to determining that the instance of the variable comprises a reference to the variable and that the symbol table includes one entry for the variable indicating that the variable is declared.

10. The article of manufacture of claim 9, wherein the operations further comprise:
processing the symbol table in response to scanning and processing all instances of variables in the source program;
determining variables whose entries in the source table indicate that the variable symbol is declared, but not initialized and/or referenced; and
generating a message indicating that the determined variables are declared but not initialized and/or referenced.

11. The article of manufacture of claim 6, wherein the operations further comprise:
adding an entry to the symbol table for variable elements of a dimensioned variable symbol in response to determining that the instance of the variable comprises a declaration of a dimensioned variable symbol having a plurality of elements; and
indicating in each entry added to the symbol table for the variable elements that the variable elements are declared, uninitialized and not referenced.

12. The article of manufacture of claim 11, wherein the operations further comprise:
indicating in the entry for one variable element in the symbol table that the variable element is initialized or referenced in response to determining that the instance of the variable comprises an initialization or reference of the variable element.

13. The article of manufacture of claim 6, wherein the operations of scanning the source code, adding the entry to the symbol table, and generating the message are performed by a preprocessor and wherein the variable comprises a variable symbol.

14. The article of manufacture of claim 6, wherein the operations of scanning the source code, adding the entry to the symbol table, and generating the message are performed by a compiler and wherein the variable comprises a symbolic name.

* * * * *